(12) United States Patent
Garabello et al.

(10) Patent No.: US 8,534,148 B2
(45) Date of Patent: Sep. 17, 2013

(54) GEAR CHANGE DEVICE FOR A MOTOR VEHICLE

(75) Inventors: Marco Garabello, Orbassano (IT);
Gianluigi Pregnolato, Orbassano (IT);
Andrea Piazza, Orbassano (IT)

(73) Assignee: C.R.F. Società Consortile per Azioni, Orbassano (Turin) (IT)

( * ) Notice: Subject to any disclaimer, the term of this patent is extended or adjusted under 35 U.S.C. 154(b) by 249 days.

(21) Appl. No.: 13/194,381

(22) Filed: Jul. 29, 2011

(65) Prior Publication Data
US 2012/0079903 A1 Apr. 5, 2012

(30) Foreign Application Priority Data
Sep. 30, 2010 (EP) .................................... 10184695

(51) Int. Cl.
*F16H 3/08* (2006.01)
(52) U.S. Cl.
USPC .............................................. 74/330; 74/331
(58) Field of Classification Search
USPC .................... 74/330, 331, 333, 335, 340
See application file for complete search history.

(56) References Cited

U.S. PATENT DOCUMENTS

| | | | |
|---|---|---|---|
| 7,360,466 B2 * | 4/2008 | Seo ................................. | 74/331 |
| 7,383,749 B2 * | 6/2008 | Schafer et al. ................... | 74/340 |
| 7,690,278 B2 | 4/2010 | Burgardt et al. | |
| 8,104,366 B2 * | 1/2012 | Remmler et al. ................ | 74/330 |
| 8,104,367 B2 * | 1/2012 | Singh et al. ...................... | 74/331 |
| 8,166,841 B2 * | 5/2012 | Remmler ......................... | 74/330 |

(Continued)

FOREIGN PATENT DOCUMENTS

| | | |
|---|---|---|
| DE | 10 2004 056 936 A1 | 6/2006 |
| KR | 20100062642 | 6/2010 |
| WO | 2006/056325 A2 | 6/2006 |

OTHER PUBLICATIONS

European Search Report for corresponding priority application No. EP10184695.4, dated Jan. 25, 2011, and completed on Jan. 19, 2011.

*Primary Examiner* — Troy Chambers
*Assistant Examiner* — Michael Gonzalez
(74) *Attorney, Agent, or Firm* — Heslin Rothenberg Farley & Mesiti P.C.; Victor A. Cardona

(57) ABSTRACT

A gear change device for a motor vehicle includes a first and a second primary shaft coaxial with respect to each other, selectively connectable to the driving shaft of the motor vehicle by means of a double clutch engagement device, and a first and a second secondary shaft, whose axes are parallel and spaced from the common axis of said primary shafts, and having respective output gear wheels intended to mesh with the gear wheel of a differential. A plurality of pairs of gear wheels correspond to a plurality of forward gear ratios and to at least one reverse gear ratio. The gears of each pair are one rigidly connected in rotation with one of the primary shafts or with one of the secondary shafts while the other is freely rotatable respectively on one of the secondary shafts or on one of the primary shafts. A parking gear wheel is operatively connected to said first secondary shaft cooperating with a lock device for locking the gear change device in the parking condition. The parking gear wheel is rotatably mounted on a fourth axis, parallel and spaced both with respect to the common axis of the two primary shafts and with respect to the axes of the two secondary shafts.

6 Claims, 2 Drawing Sheets

(56) References Cited

U.S. PATENT DOCUMENTS

| | | | |
|---|---|---|---|
| 8,333,126 B2* | 12/2012 | Enstroem et al. | 74/330 |
| 8,333,127 B2* | 12/2012 | Singh et al. | 74/330 |
| 8,443,686 B2* | 5/2013 | Singh et al. | 74/330 |
| 2006/0032320 A1* | 2/2006 | Seo | 74/325 |
| 2007/0277633 A1 | 12/2007 | Burgardt et al. | |
| 2009/0266191 A1* | 10/2009 | Remmler | 74/331 |
| 2010/0251840 A1* | 10/2010 | Mohlin et al. | 74/330 |
| 2010/0294058 A1* | 11/2010 | Singh et al. | 74/330 |
| 2010/0294059 A1* | 11/2010 | Singh et al. | 74/330 |
| 2010/0319473 A1* | 12/2010 | Singh et al. | 74/331 |
| 2011/0138943 A1* | 6/2011 | Mohlin et al. | 74/331 |
| 2011/0138944 A1* | 6/2011 | Mohlin et al. | 74/331 |

* cited by examiner

US 8,534,148 B2

GEAR CHANGE DEVICE FOR A MOTOR VEHICLE

CROSS REFERENCE TO RELATED APPLICATIONS

This application claims priority from European Patent Application No. 10184695.4 filed on Sep. 30, 2010, the entire disclosure of which is incorporated herein by reference.

BACKGROUND OF THE INVENTION

The present invention refers to gear change devices for motor vehicles, of the type comprising:

a first and a second primary shaft coaxial with respect to each other, selectively connectable to the driving shaft of the motor vehicle by means of a double clutch engagement device, a first and a second secondary shaft, whose axes are parallel and spaced from the common axis of said primary shafts, and having respective output gear wheels intended to mesh with the gear wheel of a differential, a plurality of pairs of gear wheels, corresponding to a plurality of forward gear ratios and to at least one reverse gear ratio, wherein the gear wheels of each pair are one rigidly connected in rotation with one of the primary shafts or with one of the secondary shafts while the other is freely rotatable on one of the secondary shafts or on one of the primary shafts respectively, a plurality of gear selector devices for rotatably coupling each of said freely rotatable gear wheels with the shaft on which it is mounted, wherein the reverse gear ratio is defined by:

a first reverse gear wheel mounted freely rotatable on the first secondary shaft and connectable in rotation with the latter by means of one of said selector devices, with the aim of selecting the reverse gear, a second reverse gear wheel, which serves as an idler gear wheel for inverting the motion, which meshes with said first reverse gear wheel and which is mounted freely rotatable on the second secondary shaft, said second reverse gear wheel being permanently connected in rotation with a forward gear wheel which is mounted freely rotatable on the abovementioned second secondary shaft and meshes with a gear wheel rotatably rigidly connected on one of said primary shafts, wherein a parking gear wheel is operatively connected to said first secondary shaft cooperating with a lock device for locking the gear change device in the parking condition.

A gear change device of the above indicated type is described in DE 10 2004 056 936 and in the corresponding U.S. Pat. No. 7,690,278 B2 and WO 2006/056325.

A gear change device of the type indicated in the preamble of claim 1 is shown in FIG. 5 of KR 2010 0062642 A.

The object of the present invention is that of providing a gear change device of the above indicated type which is simple and functional from a construction point of view. In particular an object of the present invention is that of providing a gear change device of the above indicated type which can be designed with greater flexibility of choice for the positioning of the various components thereof, according to the available spaces.

With the aim of attaining such objects, the invention Provides a gear change device as set forth in claim 1.

Preferably, the abovementioned first and second auxiliary gear wheel are arranged substantially in the same plane in which the abovementioned forward gear wheel is arranged, while said parking gear wheel is spaced from such plane in the opposite direction with respect to said first reverse gear wheel.

According to a particularly advantageous solution, the abovementioned parking gear wheel is rotatably mounted on a shaft on which one of said selector devices is slidingly mounted. Alternatively, the parking gear wheel is rotatably mounted on a fourth shaft of the gearbox, dedicated thereto.

In the device according to the invention, the parking gear wheel is not mounted directly on the abovementioned first secondary shaft, as in the case of the above mentioned prior art document, but it is arranged spaced from such shaft and indirectly connected thereto, thus allowing the designers a greater flexibility when arranging the various elements of the gearbox and in particular the lock device cooperating with the parking gear wheel, according to the available spaces. At the same time, the gear change device according to the invention maintains all the advantages of the abovementioned prior art device.

BRIEF DESCRIPTION OF THE DRAWINGS

Further characteristics and advantages of the invention shall be clear from the description that follows with reference to the attached drawings, purely provided by way of example, wherein.

DETAILED DESCRIPTION OF THE INVENTION

Figure 1:
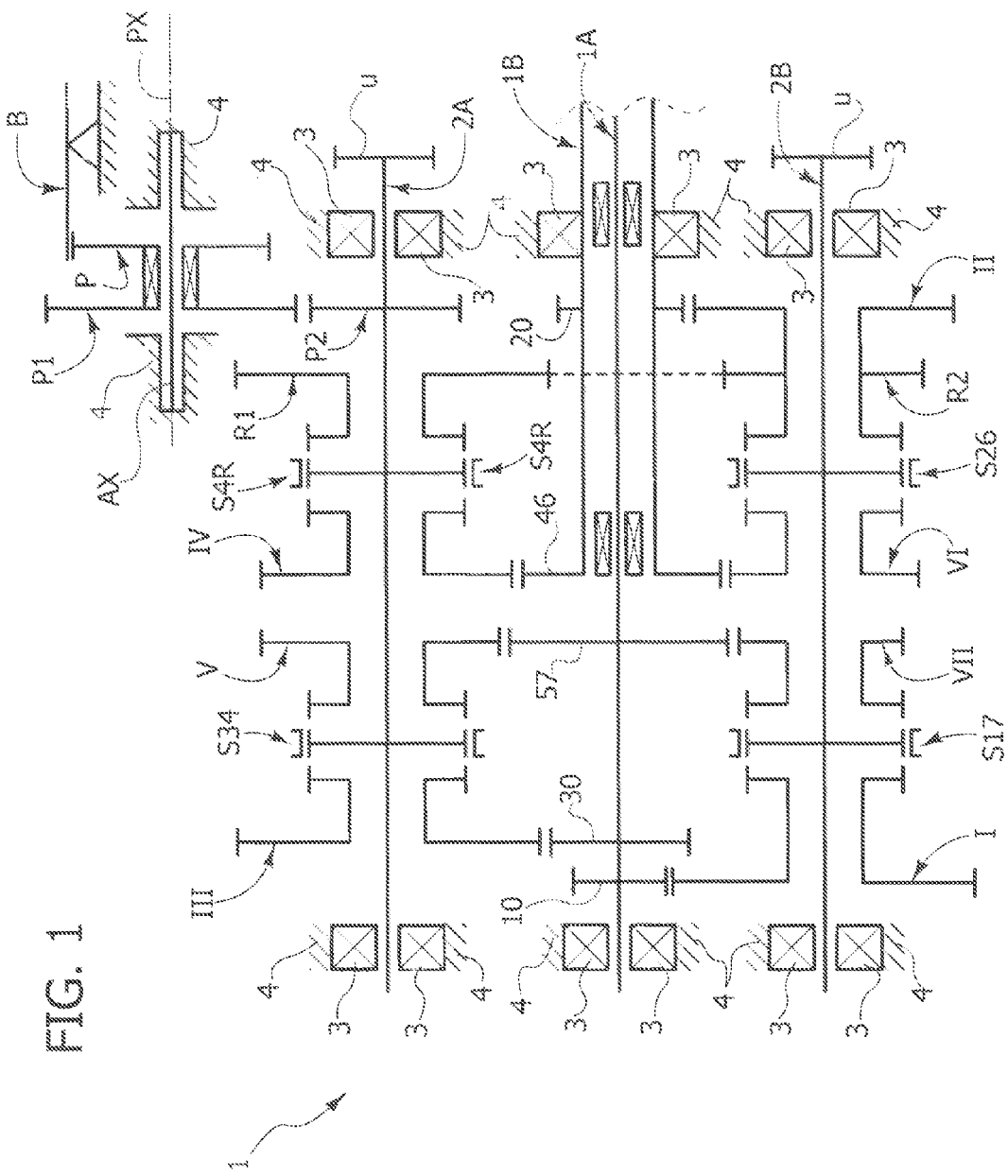
FIG. 1 is a diagram of a first embodiment of the gear change device according to the invention.

With reference to both figures, a gear change device for a motor vehicle, comprising a first primary shaft 1A and a second primary shaft 1B coaxial with respect to each other, whose right ends (with reference to the figures) are selectively connectable to the driving shaft of a motor vehicle by means of a double clutch engagement device of any known type (not illustrated) is indicated in its entirety with number 1.

A first and a second secondary shaft, whose axes are parallel and spaced from the common axis of the two primary shafts 1A, 1B are indicated in their entirety with references 2A, 2B.

For better clarity, the figures show the shafts 1A, 1B, 2A, 2B as if the three axes thereof were arranged in the same plane, while such axes actually are not coplanar, but they are arranged to form a triangle.

All the abovementioned shafts are rotatably supported by means of roller bearings 3 within the casing 4 of the gearbox.

The two secondary shafts 2A, 2B have—at the right ends thereof (with reference to the figures)—output gear wheels intended to mesh both, in a per se known manner, with a gear wheel of a differential (not illustrated).

The illustrated gear change device has a plurality of pairs of gear wheels, corresponding to the plurality of forward gear ratios and to one reverse gear ratio, wherein the gear wheels of each pair are one rigidly connected in rotation with one of the primary shafts or with one of the secondary shafts, while the other is freely rotatable respectively, in both cases, on one of the secondary shafts or on one of the primary shafts. Furthermore, still according to the conventional art, the device comprises a plurality of gear selector devices suitable for rotatably coupling each of said freely rotatable gear wheels with the shaft on which it is mounted.

In the illustrated specific case, references I, II, III, IV, V, VI, VII, R1 respectively indicate gear wheels freely rotatably mounted on the first or on the second secondary shaft 2A, 2B and couplable with the respective secondary shaft for respectively selecting the first, second, third, fourth, fifth, sixth, seventh gears and the reverse gear.

The gear wheel I meshes with a gear wheel 10 rigidly and permanently connected in rotation with the first primary shaft 1A, i.e. on the inner primary shaft, on one end portion thereof extending beyond the end of the second primary shaft 1B.

The gear wheel II of the second gear meshes with a gear wheel 20 rigidly connected to the primary shaft 1B.

The gear wheel III of the third gear meshes with a gear wheel 30 rigidly connected to the primary shaft 1A.

The gear wheel IV of the fourth gear and the gear wheel VI of the sixth gear both mesh with the same gear wheel 46 rigidly connected to the primary shaft 1B.

The gear wheel V of the fifth gear and the gear wheel VII of the seventh gear both mesh with the same gear wheel 57 rigidly connected to the primary shaft 1A.

The selector devices for rotatably coupling each of the gear wheels I, II, III, IV, V, VI, VII, R1 are indicated with references S17, S26, S34, S4R, each of such selector devices being actuatable in opposite directions for selecting different gears (the digits of the number that follows the reference S indicate the gears thus selectable).

In both attached figures, the second forward gear is defined by a pair of gear wheels IIA, IIB, the first permanently connected in rotation with the outermost primary shaft 1B and the other mounted freely rotatable on the second secondary shaft 2B and rotatably couplable therewith through an engagement device schematically illustrated in the drawing and indicated with reference S2/6 (to indicate that such device selects the second gear in one direction and the sixth gear in the other direction).

The reverse gear ratio is defined by the first reverse gear wheel R1 which is mounted freely rotatable on the first secondary shaft 2A and it is rotatably couplable therewith through the selector device S4R and by a second reverse gear wheel R2, which serves as an idler gear wheel for inverting the motion and which meshes with the first gear wheel R1 (such meshing, diagrammatically shown in the figure by a dashed line, being possible due to that the two axes of the secondary shafts and the common axis of the primary shafts are not contained in the same plane). The second reverse gear wheel R2 is permanently connected in rotation with the gear wheel II of the second gear and it is mounted freely rotatable on the second secondary shaft 2B.

With the arrangement described above, the engagement of the reverse gear is obtained by activating the selector device S4R and leaving the selector device S26 disabled, so as to leave the second reverse gear wheel R2 freely rotatable on the second secondary shaft 2B. In such situation, the motion coming from the outermost primary shaft 1B is transferred to the gear wheel II and therefrom to the gear wheel R2, to the gear wheel R1 and to the first secondary shaft 2A.

Figure 2:
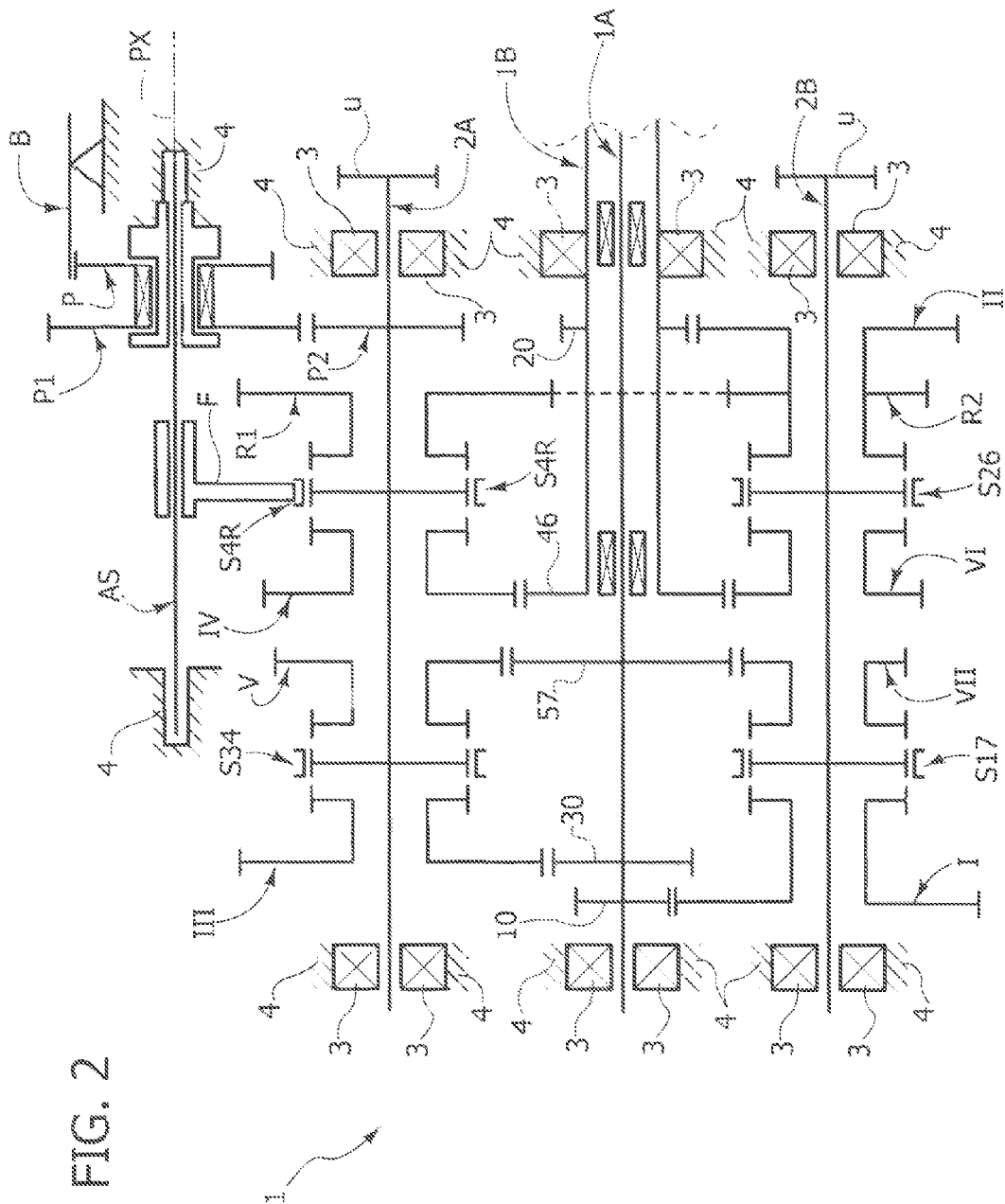
FIG. 2 is a diagram of a second embodiment of the gear change device according to the invention.

Lastly, in both solutions illustrated in FIGS. 1, 2 a parking gear wheel P cooperating with a parking device B which can be of any known type (illustrated solely schematically in the drawings) for locking the gear change device in the parking condition is operatively connected to the first secondary shaft 2A.

According to the invention, the parking gear wheel P is rotatably mounted around an axis PX which is spaced both with respect to the common axis of the two primary shafts 1A, 1B and with respect to the axes of the secondary shafts 2A, 2B. In the case of the first embodiment illustrated in FIG. 1, the parking gear wheel P is mounted freely rotatable on a shaft AX dedicated thereto which is rotatably supported around the axis PX of the structure 4 of the gear change device, as schematically illustrated in the drawing.

In the case of the variant of FIG. 2, the parking gear wheel P is mounted freely rotatable on a shaft AS which is not dedicated thereto, being exploited for slidingly guiding the hub of the fork F for actuating the selector device S4R.

In both cases, the parking gear wheel B is permanently connected in rotation with a first auxiliary gear wheel P1 around the axis PX. The first auxiliary gear wheel P1 meshes with a second auxiliary gear wheel P2 which is permanently connected in rotation with the first secondary shaft 2A.

As observable, in both cases the two auxiliary gear wheels P1, P2 may be contained in the same plane containing the gear wheel of the second gear II, which is used for transmitting motion to the first reverse gear wheel R1 in the condition of selecting the reverse gear. The parking gear wheel P, instead, is displaced with respect to such plane, in the opposite direction with respect to the abovementioned first reverse gear wheel R1.

Due to the above indicated characteristics, the gear change device according to the invention, besides maintaining all the characteristic advantages of the abovementioned device, facilitates the designer in that it allows a wider range of choice when arranging the various members of the gearbox, and in particular the members associated to the lock device for the parking according to the available spaces.

Obviously, without prejudice to the principle of the invention, the construction details and the embodiments may widely vary with respect to what has been described and illustrated purely by way of example, without departing from the scope of protection of the present invention.

What is claimed is:

1. A gear change device for a motor vehicle, comprising:
a first primary shaft and a second primary shaft coaxial with respect to each other, selectively connectable to a driving shaft of the motor vehicle by means of a double clutch engagement device,
a first secondary shaft and a second secondary shaft, whose axes are parallel and spaced from the common axis of said primary shafts, and having respective output gear wheels intended to mesh with the gear wheel of a differential,
a plurality of pairs of gear wheels, corresponding to a plurality of forward gear ratios and to at least one reverse gear ratio, wherein a first gear wheel of the gear wheels of each pair is rigidly connected in rotation with one of the primary shafts or with one of the secondary shafts while a second gear wheel of each pair is freely rotatable on one of the secondary shafts or on one of the primary shafts,
a plurality of gear selector devices for rotatably coupling each of said freely rotatable gear wheels with the shaft on which it is mounted,
wherein the reverse gear ratio is defined by:
a first reverse gear wheel mounted freely rotatable on the first secondary shaft and connectable in rotation with the first secondary shaft by means of one of said selector devices, with the aim of selecting the reverse gear,
a second reverse gear wheel, which serves as an idler gear wheel for inverting the motion, which meshes with said first reverse gear wheel and which is mounted freely rotatable on the second secondary shaft, said second reverse gear wheel being permanently connected in rotation with a forward gear wheel which is mounted freely rotatable on said second secondary shaft and meshes with a gear wheel rotatably rigidly connected on one of said primary shafts, wherein a parking gear wheel is operatively connected to said first secondary shaft cooperating with a lock device for locking the gear change device in the parking condition, wherein said parking gear wheel is rotatably mounted on a fourth axis, parallel and spaced with respect to the common axis of the two primary shafts and with respect to the axes of the two secondary shafts, and said parking gear wheel permanently connected in rotation around said fourth axis with a first auxiliary gear wheel, which meshes with a second auxiliary gear wheel connected in rotation on said first secondary shaft.

2. Gear change device according to claim 1, wherein said first and second auxiliary gear wheel are arranged substantially in the same plane in which said forward gear wheel used for the reverse gear ratio is arranged, while said parking gear wheel is spaced from such plane in the opposite direction with respect to said first reverse gear wheel.

3. Gear change device according to claim 1, wherein said parking gear wheel is rotatably mounted on a shaft on which an actuator member of one of said selector devices is slidingly mounted.

4. Gear change device according to claim 1, wherein said parking gear wheel is rotatably mounted on a dedicated shaft.

5. Gear change device according to claim 2, wherein said parking gear wheel is rotatably mounted on a shaft on which an actuator member of one of said selector devices is slidingly mounted.

6. Gear change device according to claim 2, wherein said parking gear wheel is rotatably mounted on a dedicated shaft.

* * * * *